(12) United States Patent
Dean (10) Patent No.: US 7,141,100 B2
(45) Date of Patent: Nov. 28, 2006

(54) LOW FLOW PHASE SEPARATOR WITH INTERMITTENT PUMPING

(75) Inventor: W. Clark Dean, Simsbury, CT (US)

(73) Assignee: Hamilton Sundstrand, Windsor Locks, CT (US)

( * ) Notice: Subject to any disclaimer, the term of this patent is extended or adjusted under 35 U.S.C. 154(b) by 287 days.

(21) Appl. No.: 10/758,623

(22) Filed: Jan. 15, 2004

(65) Prior Publication Data

US 2005/0155493 A1 Jul. 21, 2005

(51) Int. Cl.
*B01D 19/00* (2006.01)

(52) U.S. Cl. ............................ 96/157; 96/168; 96/169; 96/172; 96/174; 96/208; 96/214; 96/216; 96/421

(58) Field of Classification Search .................. 96/156, 96/157, 158, 168, 169, 208, 214, 215, 216, 96/421, 172, 174; 55/406

See application file for complete search history.

(56) References Cited

U.S. PATENT DOCUMENTS

| 2,989,143 | A | * | 6/1961 | Hallstrom | 95/246 |
| 5,693,125 | A | * | 12/1997 | Dean | 96/157 |
| 6,547,862 | B1 | * | 4/2003 | Dean | 96/174 |

* cited by examiner

*Primary Examiner*—Robert A. Hopkins
(74) *Attorney, Agent, or Firm*—Carlson, Gaskey & Olds (57) ABSTRACT

A low flow rotary separator includes a housing that defines a separator chamber and a liquid/gas mixture inlet. A shaft driven by a motor includes a plurality of disks in frictional contact with the mixture to drive the liquid outward against an inner wall of the separator and displace gas to a central region about the shaft. The liquid exits through a liquid outlet valve into a high-pressure storage container. The pressure of the liquid is increased to allow flow into the high-pressure storage container by a pump driven by the shaft. A level control valve closes in response to a predetermined pressure differential between liquid in the feed line and liquid within the separator chamber to allow liquid flow through an outlet check valve.

26 Claims, 4 Drawing Sheets

LOW FLOW PHASE SEPARATOR WITH INTERMITTENT PUMPING

BACKGROUND OF THE INVENTION

This invention relates generally to a low flow rotary phase separator for separating liquid from gas in a zero or variable gravity environment and transmitting separated liquid to a system or container at a greater pressure than the incoming liquid/gas mixture.

Typically, the separation of gas from a liquid is accomplished by allowing entrapped gas to bubble upward out of the liquid under the influence of gravity. This method does not work in zero or variable gravity environment encountered by space vehicles.

Typically, in such environments, a liquid/gas circulation system is used that includes a circulating pump; an accumulator to accommodate volume changes in the liquid/gas mixture and a separator to separate the liquid phase from the gas phase.

In some applications it is required to operate a very low liquid/gas mixture flow rates. The low flow rates are also at low pressures. In some instances, it is required that liquid separated out of the liquid/gas mixture be stored in a pressurized storage tank or system.

A known system is a rotary phase separator that uses centrifugal force to separate the liquid phase from the gas phase can be utilized. Rotary phase separators can be adapted for low flow and low-pressure operation, but cannot delivery liquid at elevated pressures.

For this reason it is desirable to develop a phase separator system that does not become contaminated during use, which does not require periodic replacement and which can accommodate liquid level fluctuations, thereby allowing the separator to be used as an accumulator.

SUMMARY OF THE INVENTION

The invention is a rotary phase separator assembly for separating a low flow, low pressure liquid/gas mixture into liquid and gas and transferring the liquid to a high pressure storage container by increasing liquid pressure with a pump in response to the accumulation of a predetermined amount of liquid within the separator assembly.

The rotary phase separator assembly for separating liquid and gas contained in a liquid/gas mixture includes a housing that defines a separator chamber. A liquid/gas inlet transmits the liquid/gas mixture into the separator chamber. The liquid/gas inlet flows into the separating chamber at a relatively low flow and pressure and is separated into liquid and gas components by rotating disks attached to a driven shaft. The liquid exits through a liquid outlet valve into a high-pressure storage container. Because the storage container is at a greater pressure than the incoming liquid/gas mixture, the pressure of the liquid must be raised before exiting the separator assembly. The separator assembly includes a pump to increase liquid pressure to open the outlet valve. The pump increases pressure above the level required to open the outlet valve only when a return passage from the pump outlet to the separator chamber is closed in response to a predetermined amount of liquid being present within the separator chamber.

Accordingly, the rotary phase separator of this invention provide for incoming low flow liquid/gas mixture to be separated and pressure in the liquid increased to flow into a system or storage container at a higher pressure.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
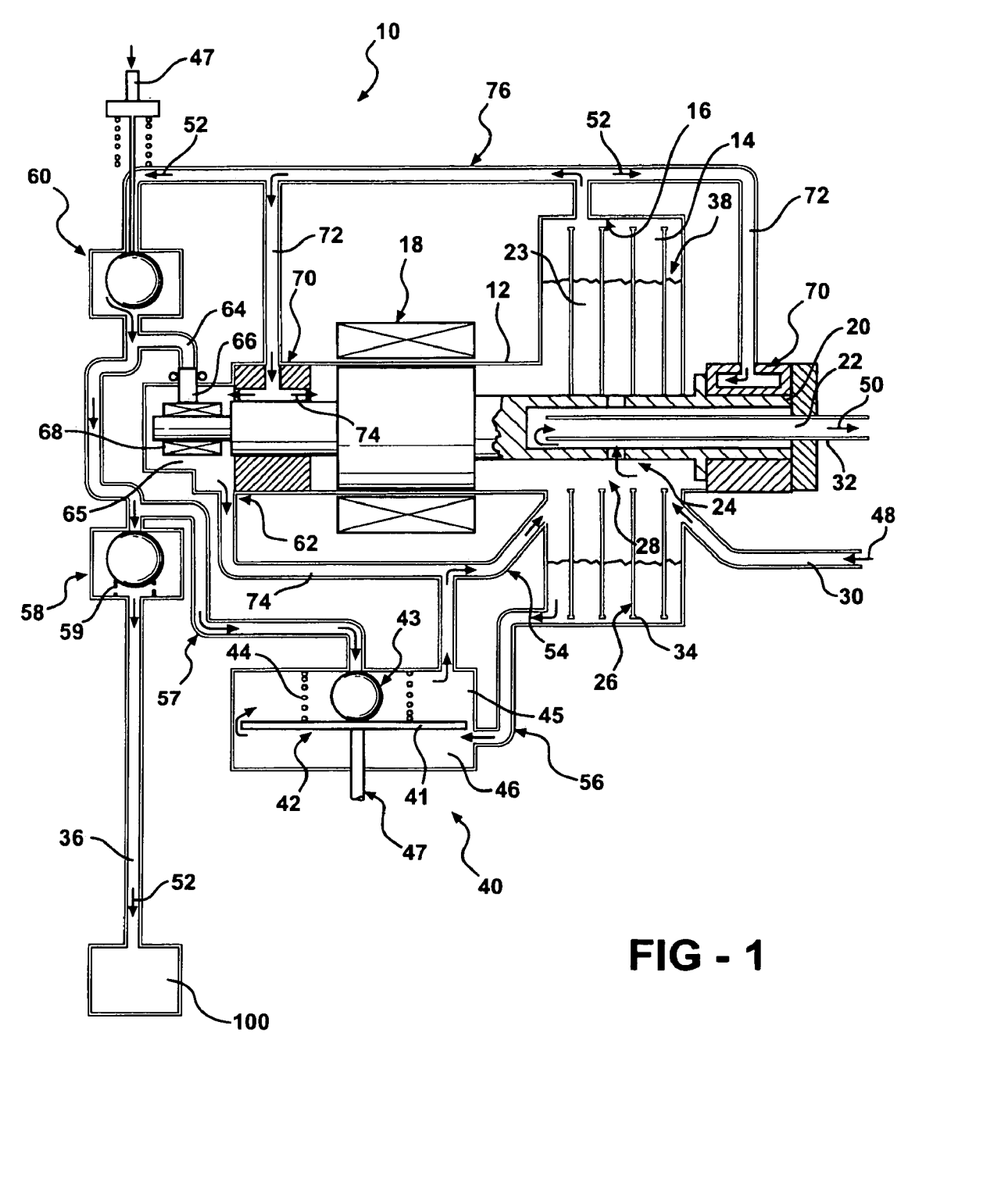
FIG. 1 is a cross sectional view of the rotary phase separator.

Referring to the FIG. 1, wherein like numerals indicate like or corresponding parts throughout the several views, the subject invention is a rotary phase separator assembly for separating liquid and gas contained in a liquid/gas mixture and is generally shown at 10 in FIG. 1. The rotary liquid/gas separator assembly 10 includes a housing 12 that defines a separator chamber 14. The separating chamber 14 includes inner walls 16 that define an outermost diameter. A liquid/gas inlet 30 transmits the liquid/gas mixture 48 into the separator chamber 14. The liquid/gas mixture 48 flows into the separating chamber 14 at a relatively low flow and pressure and are separated into liquid 52 and gas 50 components. The liquid 52 exits through a liquid outlet valve 58 into a high-pressure storage container 100. Because the storage container 100 is at a greater pressure than the incoming liquid/gas mixture 48, the pressure of the liquid 52 must be raised before exiting the separator assembly 10. The separator assembly 10 includes a level control valve 40 and a pump 62 to achieve the required increased pressure of exiting liquid 52.

The separator assembly 10 includes a shaft 20 supported for rotation about a longitudinal axis within the separator chamber 14. The shaft 20 includes a hollow internal cavity 22 that is in communication with a gas outlet 32. The shaft 20 is driven by a drive 18. Preferably, the drive 18 is an electric motor as is known by a worker skilled in the art. Although an electric motor is preferred, it is within the contemplation of this invention to use other drive means as are expedient for a specific application.

A plurality of disks 26 is attached to rotate with the shaft 20. The disks 26 are in frictional contact with the liquid/gas mixture 48 entering the separator chamber 14 such that rotation of the disks 26 creates centrifugal force that drives the liquid component toward the inner walls 16 of the separator chamber 14. At least one of the disks 26 includes a cylinder 34 attached about a perimeter. Each cylinder 34 is attached perpendicular relative to the disk 26. The cylinders 34 aid in driving fluid outwardly against the inner walls 16 of the separator chamber 14. The disks 26 also include a plurality of openings 28 disposed close to the shaft 20 providing for the flow of the liquid/gas mixture 48 between disks 26. Further, the cylinders 34 disposed about each disk 26 are spaced apart to allow liquid flow outwardly against the inner wall 16.

The liquid component of the liquid/gas mixture driven against the inner walls 16 by centrifugal force forms a liquid ring 38. The gas component moves toward the shaft 20 forming a gas core 23 between the water ring 38 and the shaft 20. The liquid ring 38 is in fluid communication with a feed passage 76. The feed passage 76 provides liquid to the pump 62 and to hydrodynamic bearings 70. The hydrodynamic bearings 70 support rotation of the shaft 20 within the housing 12. The hydrodynamic bearings 70 provide a cushion of liquid to support the shaft 20. The cushion of liquid is provided by inlet passages 72. Further, outlet passages 74 circulate liquid away from the hydrodynamic bearings 70 such that liquid is constantly flowing through the hydrodynamic bearings 70. Although hydrodynamic bearings 70 are illustrated, it is within the contemplation of this invention that other types of bearing, as are known in the art, can be used to support the shaft 20.

The feed passage 76 also supplies fluid to the pump 62. The pump 62 preferably comprises a pump chamber 64 with a piston 66 driven by an eccentric pin 68. The pin 68 is driven by the shaft 20 and rotates within the eccentric chamber 65. The piston 66 oscillates within the pump chamber 64 in response to rotation of the shaft 20 and pin 68. An inlet check valve 60 allows fluid to enter the pump chamber 64 from the feed passage 76, but prevents fluid from exiting back through the feed passage 76 toward the separator chamber 16.

Liquid pumped from the pump chamber 64 flows directly to an outlet check valve 58 and through a bypass passage 57 to a level control valve 40. The level control valve 40 closes in response to a predetermined pressure differential between a gas core 23 and liquid ring 38 at the inner walls 16 within the separator chamber 14. The level control valve 40 includes a liquid return line 54 that connects a low pressure chamber 45 to the gas core 23 and a level sensing supply line 56. Liquid from the liquid ring 38 is transmitted to a high pressure chamber 46 of the level control valve 40. The pressure of the liquid ring 38 increases with an accumulation of liquid. As more liquid is separated, the pressure caused by rotation of the disks 26 and the generated centrifugal force increases. The level control valve 40 includes a piston assembly 42. The piston assembly 42 preferably includes a piston 41 that is sensitive to the pressure differential between the low pressure chamber 45 and the high pressure chamber 46. A seal ball 43 closes off return flow from the pump 62 and a check valve extension pin 47 opens inlet check valve 60. A biasing member 44 biases the piston assembly 42 toward the pump bypass position in response to a predetermined desired pressure against the piston 41.

The outlet valve 58 includes a biasing member 59 that opens in response to an increase in pressure above a predetermined level. The predetermined level corresponds to the pressure required to allow liquid to exit the separator assembly 10 through liquid outlet 36 and enter the high-pressure storage tank 100. Although a storage tank 100 is shown, it is within the contemplation of this invention that any system using the expelled liquid can be attached to receive liquid output from the separator assembly 10. Further, the configuration of the outlet valve 58 may be of any type known to a worker skilled in the art.

In operation, the liquid/gas mixture 48 enters the separator chamber 14 through the inlet 30. The mixture 48 flows into the separator chamber 14 and contacts the disks 26 and cylinders 34. The disks 26 are spinning within the chamber 14 and frictionally contact the incoming mixture. The liquid component is heavier than the gas component and is therefore driven outward toward the inner walls 16 of the chamber 14. The liquid forms a liquid ring 38 displacing the gas component and driving gas toward the shaft 20 forming a gas core 23. The shaft 20 includes an opening 24 into a hollow chamber 22. The hollow chamber 22 leads to the gas outlet 32. Gas flows from the gas core 23 through the opening 24, through the hollow chamber 22 and through the gas outlet 32 to either a storage device or another system that will utilize the gas 50.

The liquid ring 38 is in communication with the feed passage 76. Liquid from the liquid ring 38 exits the separator chamber 14 through the feed passage 76 and flows to the pump chamber 64. A portion of liquid 52 flows into the inlet and outlet passages 72,74, to supply liquid to the hydrodynamic bearing assemblies 70. The remainder of the liquid 52 flows through the inlet check valve 60 and into the pump chamber 64. The pump 62 transmits liquid to the outlet valve 58 and to the level control valve 40.

Liquid from the pump 62 flows into the level control valve 40 and back out to the separator chamber 14 through the return passage 54. The open return passage 54 prevents pressures within the pump chamber 64 and at the outlet valve 58 from increasing above a predetermined pressure that would open the outlet valve 58. As the liquid accumulates within the separator chamber 14, liquid pressure increases. The liquid pressure of the liquid ring 38 is communicated to the level control valve 40 through the supply passage 56. As the level of the liquid ring 38 increases, corresponding to an increase in liquid within the chamber 14, the pressure within the supply passage 56 increases to provide an accompanying increase within the high pressure chamber 46. Once pressure within the chamber 46 is enough to overcome the biasing member 44, the seal ball 43 closes off the bypass passage 57 and retracts the check valve extension pin 47 allowing inlet check valve 60 to operate normally. The level of the liquid ring 38 is maintained within a desired range by allowing the pump 62 to deliver flow to the liquid outlet 36 or to bypass flow back to the separating chamber 14.

The pump 62 is continuously pumping liquid into and out of the pump chamber 64. Once the return passage 54 is closed, pressure of liquid becomes of such a level to open the outlet valve 58 and allows liquid into the storage container 100. The outlet valve 58 will remain open until pressure drops below the predetermined level. Pressure drops off as the amount of liquid within the separator chamber 14 decreases. The liquid ring 38 decreases in volume and pressure within the high pressure chamber 46 drops, causing the bypass passage 57 to open. The cycle repeats continually such that low-pressure incoming liquid/gas mixture is separated into phases while liquid pressure is built up to initiate a closing of the bypass passage 57. The pump 62 increase pressure of the liquid to open the outlet valve 58 and allow higher pressure liquid to flow into the high-pressure container 100.

Figure 2:
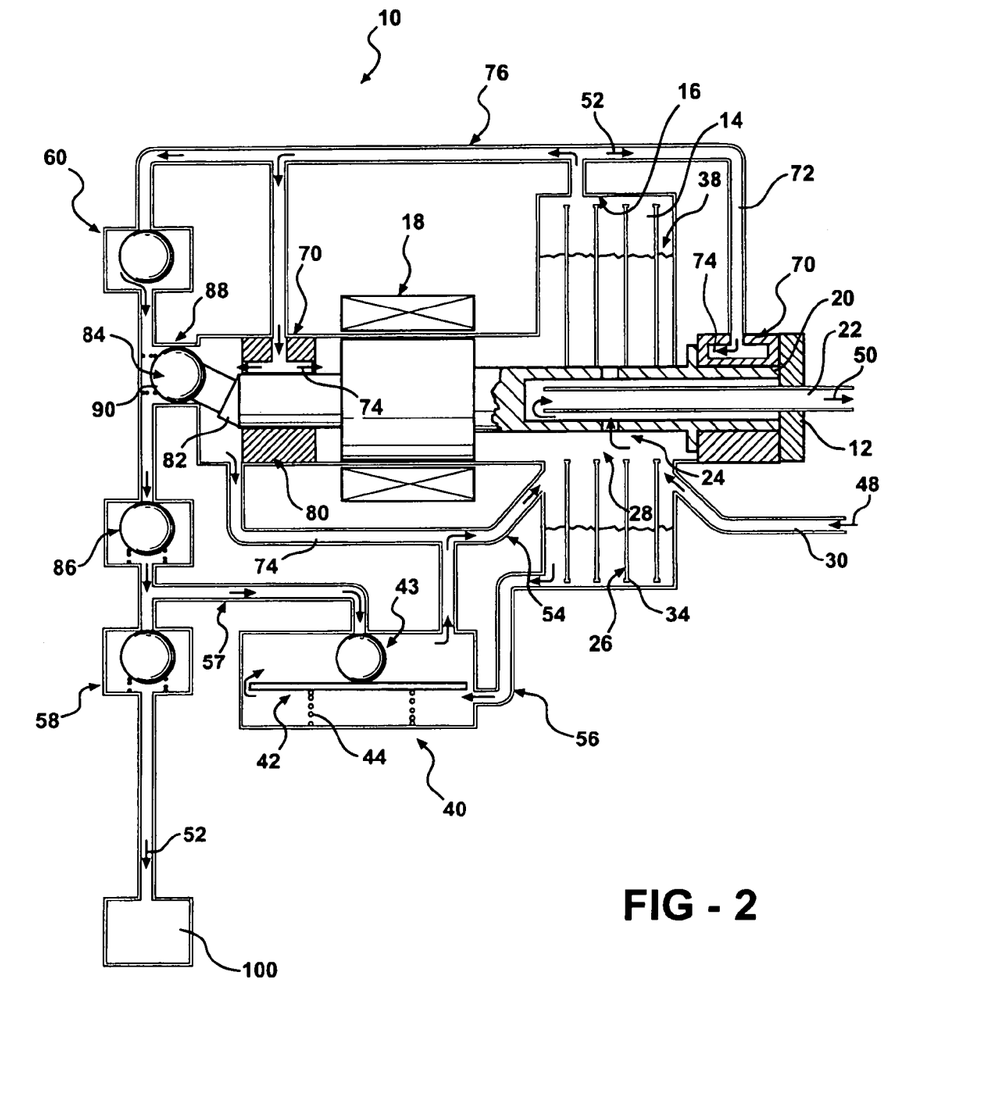
FIG. 2 is a cross sectional view of another embodiment of a rotary phase separator.

Referring to FIG. 2, another embodiment of this invention includes a swash plate pump 80. The pump 80 is driven by a swash plate 82 attached to an end of the shaft 20. The pump 80 comprises a pump chamber 90 with a ball piston 84 oscillated by the swash plate 82. A biasing member 88 biases the ball piston 84 into contact with the swash plate 82. A pump outlet valve 86 controls flow of liquid out of the pump chamber 90. Operation of the pump 80 increases liquid pressure within the pump chamber 90 to open the pump outlet valve 86. Liquid is then routed through to the outlet control valve 58 and to the level control valve 40. When the level control valve 40 closes off the bypass passage 57, liquid reaches pressure required to open the outlet valve 58 and exhaust liquid into the high pressure storage container 100.

Figure 3:
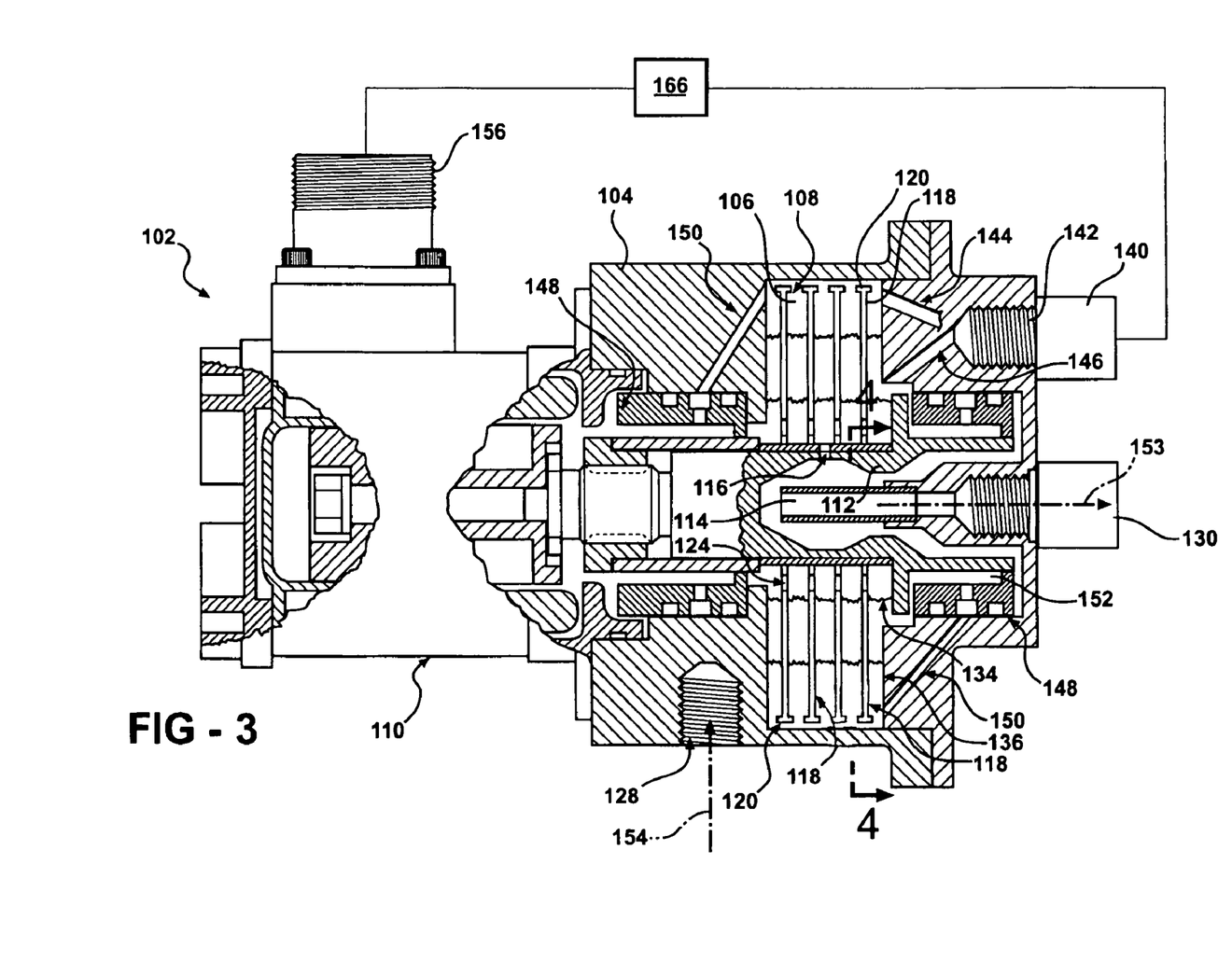
FIG. 3 is a cross sectional view of yet another embodiment of a rotary phase separator.
Figure 4:
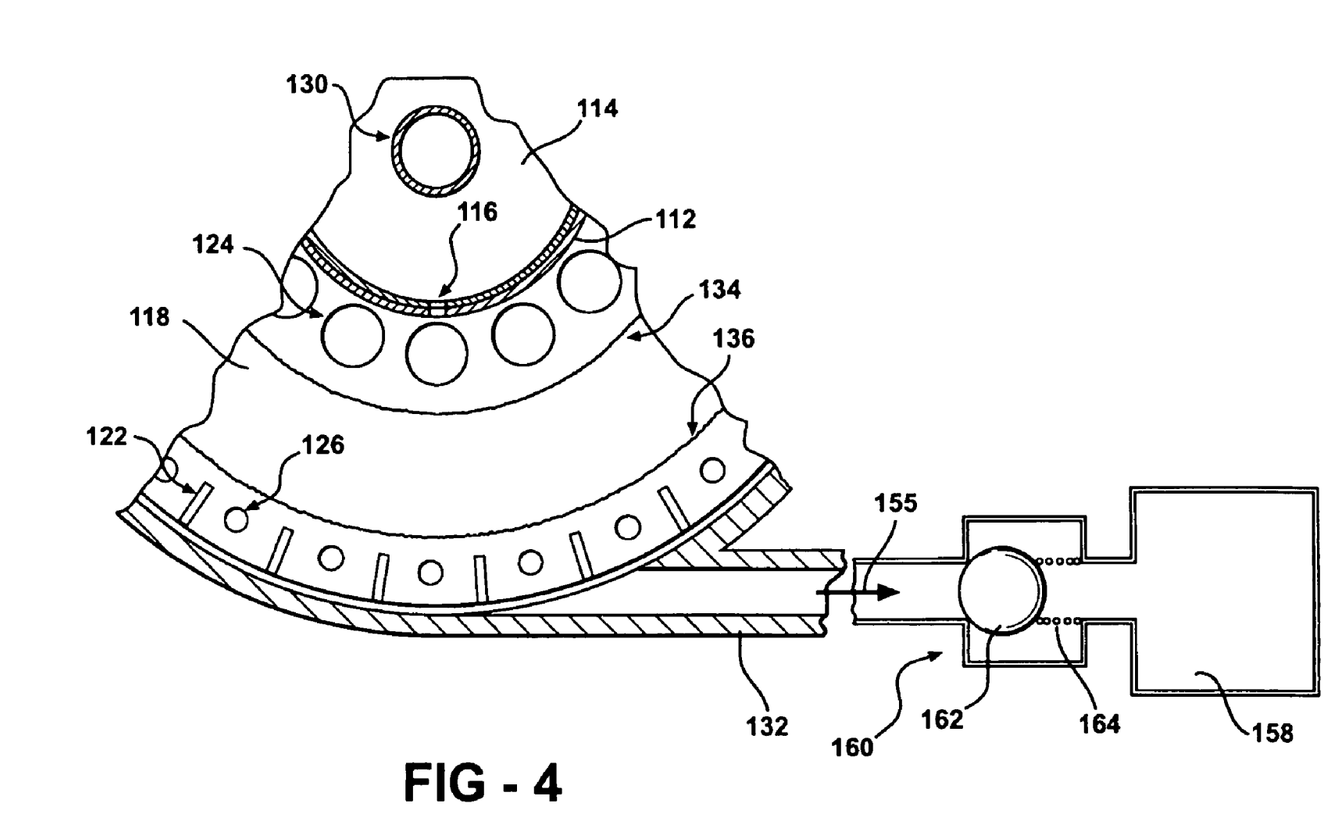
FIG. 4 is a sectional view through an outlet of the embodiment of FIG. 3.

Referring to FIGS. 3 and 4, another embodiment of a low flow rotary phase separator is shown and generally indicated at 102. The rotary liquid/gas separator assembly 102 includes a housing 104 defining a separator chamber 106 and a liquid/gas inlet 128. A shaft 112 is supported for rotation by hydrodynamic bearings 148. The shaft 112 includes a hollow chamber 114 in communication with a gas outlet 130. A plurality of disks 118 is attached to rotate with the shaft 112. The disks 118 are in frictional contact with the liquid/gas mixture 154 entering the separator chamber 106 through the inlet 128. The disks 118 create a centrifugal force that drives the liquid component toward the inner walls 108 of the separator chamber 106.

The liquid/gas mixture 154 enters the separator chamber 106 at a low pressure and liquid exits to a high-pressure storage device or system schematically indicated at 158. The assembly 102 includes a drive 10 that is preferably an electric motor. A pressure differential sensor 140 senses a pressure difference between the liquid ring 134, 136 and gas near the shaft 112. The drive 110 rotates the shaft 112 at a first speed to drive liquid toward the inner walls 108 of the separator chamber 106. The pressure built up within the liquid ring 134 at the first speed is not sufficient to increase pressure to open an outlet valve 160. The drive 110 increases speed of the shaft 112 to a second speed, higher than the first speed to increase centrifugal force on the liquid to increase pressure above a predetermined pressure required to open the outlet valve 160 and allow liquid to flow into the high pressure storage tank 158.

Cylinders 120 are attached about a periphery of at least one of the disks 118. The disks 118 include openings 124 disposed adjacent the shaft 112 to allow the liquid/gas mixture 154 to flow between the disks 118 and throughout the separator chamber 106. Another set of openings 126 is disposed near the outer perimeter of each disk 118. These openings 126 allow for the flow of liquid between disks 118. The disks 118 include vanes 122 that extend radially inward from the perimeter of the disk 118. The radially extending vanes 122 extend perpendicularly from the disk 118 to aid in the increase of speed of the liquid required to increase pressure to levels capable of opening the outlet valve 160.

Liquid within the separator chamber 106 forms a liquid ring indicated schematically at 136 and 134. Two levels of liquid rings are shown to indicate that the volume of liquid within the separator chamber 106 fluctuates during operation. Liquid from the liquid ring 134 is drawn through inlets 150 to supply liquid to the hydrodynamic bearings 148. Liquid exits the hydrodynamic bearings 148 through outlets 152.

Pressure within the liquid ring 134 and gas disposed around the shaft 112 is indicative of the level of liquid within the separator chamber 106. The differential pressure sensor 140 includes a liquid pressure passage 144 and a gas pressure passage 146. The sensor 140 communicates the difference in pressure to a controller 166. The controller 166 governs the speed of the drive 110 during a first accumulation phase and a second drain phase. The collection phase occurs at the first speed where the shaft 112 rotates at a speed to separate liquid from gas. The pressure sensor 140 monitors pressure and communicates the pressure information to the controller 166. The controller 166 increases the speed of the drive 110 in response to a predetermined pressure differential that indicates that the liquid ring 134 is at a second level that substantially fills the separator chamber.

The second level of liquid 134 can be of any level desired according to the specific operating requirements. Liquid is accelerated by the increase in shaft speed to increase pressure to a level capable of overcoming the biasing member 164 of the outlet valve 160. As appreciated, any configuration of outlet check valve 160 that opens in response to a specific pressure is within the contemplation of this invention.

The liquid outlet 132 is positioned tangential to the separator chamber 106 (Best shown at FIG. 4) such that liquid at increased pressure is driven through the outlet valve 160. Further, the vanes 122 aid in increasing the centrifugal force that increases pressure of the liquid, and further, aids in driving liquid through the outlet 132.

In operation, the drive 110 rotates the shaft 112 at a first speed to separate incoming liquid/gas mixture 154. The friction created by the rotating disks 118 drives liquid outward against the inner walls 108 of the separator chamber 106 forming a liquid ring at a first level 136. Gas is forced inward toward the shaft 112 and through the opening 116 out the gas outlet 130. A pressure differential sensor 140 monitors pressure within the liquid ring 134 and of gas near the shaft 112. The difference in pressures indicates the level of liquid within the separator chamber 106. Once the level of the liquid ring obtains a desired level such as that indicated at 134, the pressure sensor 140 communicates the pressure difference indicative of this level to the controller 166. The controller 166 signals the drive 110 to rotations of the shaft 112 to a second speed. The second speed causes a corresponding increase n centrifugal force that increase pressure within the liquid ring 134. The increased pressure opens the outlet valve 160 to allows draining of liquid. The drive 110 rotates the shaft 112 at the second speed for a predetermined time and then drops the speed back to the first speed for further collection of fluid.

The foregoing description is exemplary and not just a material specification. The invention has been described in an illustrative manner, and should be understood that the terminology used is intended to be in the nature of words of description rather than of limitation. Many modifications and variations of the present invention are possible in light of the above teachings. The preferred embodiments of this invention have been disclosed, however, one of ordinary skill in the art would recognize that certain modifications are within the scope of this invention. It is understood that within the scope of the appended claims, the invention may be practiced otherwise than as specifically described. For that reason the following claims should be studied to determine the true scope and content of this invention.

What is claimed is:

1. A rotary liquid/gas separator assembly for separating a low pressure liquid/gas mixture into liquid and gas components, said assembly comprising:
 a housing defining a separator chamber;
 a liquid/gas inlet;
 a shaft supported for rotation about a longitudinal axis within said separator chamber and having a hollow section in communication with a gas outlet;
 a drive to rotate said shaft;
 a plurality of disks attached to rotate with said shaft, said disks in frictional contact with said liquid such that rotation of said disks creates centrifugal force driving said liquid toward inner walls of said separator chamber;
 an outlet valve that opens in response to an increase in pressure above a predetermined level;
 a liquid feed passage communicating liquid from said separator chamber to a pump, said pump increasing liquid pressure above said predetermined level to open said outlet valve; and
 a level control valve that closes a bypass passage between the outlet valve and the separator chamber in response to a predetermined pressure differential between liquid increased in pressure by said pump and liquid within said separator chamber, wherein said pump includes a piston actuated within a pump chamber, said piston pumping liquid from said liquid feed passage out to said outlet valve and said level control valve.

2. The assembly of claim 1, wherein a swash plate driven by said shaft actuates said piston within said pump chamber.

3. The assembly of claim 1, wherein said piston is a ball oscillated within said pump chamber.

4. The assembly of claim 1, wherein an eccentric pin driven by said shaft actuates said piston within said pump chamber.

5. The assembly of claim 1, wherein said level control valve includes a return flow passage communicating liquid from said pump back into said separator chamber.

6. The assembly of claim 5, including a supply line communicating fluid pressure within said separator chamber to said level control valve such that said level control valve closes said return passage and pressure within said pump chamber increases above said predetermined level to open said outlet valve.

7. The assembly of claim 1, including an inlet check valve for preventing liquid flow from said pump chamber back through said liquid feed passage.

8. The assembly of claim 1, wherein said shaft is supported on a hydrodynamic bearing assembly within said housing such that said shaft rotates on a cushion of liquid, said housing includes liquid passages to supply liquid to said hydrodynamic bearings and to exhaust liquid from said hydrodynamic bearings.

9. The assembly of claim 1, wherein each of said plurality of disks includes a plurality of openings disposed near said shaft such that said liquid/gas mixture flows between disks.

10. The assembly of claim 1, wherein said drive is an electric motor.

11. A rotary liquid/gas separator assembly for separating a low pressure liquid/gas mixture into liquid and gas components, said assembly comprising:
    a housing defining a separator chamber;
    a liquid/gas inlet;
    a shaft supported for rotation about a longitudinal axis within said separator chamber and having a hollow section in communication with a gas outlet;
    a drive to rotate said shaft;
    a plurality of disks attached to rotate with said shaft, said disks in frictional contact with said liquid such that rotation of said disks creates centrifugal force driving said liquid toward inner walls of said separator chamber, wherein at least one of said plurality of disks includes a cylinder attached about a circumference;
    an outlet valve that opens in response to an increase in pressure above a predetermined level;
    a liquid feed, passage communicating liquid from said separator chamber to a pump, said pump increasing liquid pressure above said predetermined level to open said outlet value; and
    a level control valve that closes a bypass passage between the outlet valve and the separator chamber in response to a predetermined pressure differential between liquid increased in pressure by said pump and liquid within said separator chamber.

12. The assembly of claim 11, wherein said cylinder is substantially perpendicular to said disks.

13. The assembly of claim 11, further including a gap disposed between said cylinders attached to separate disks.

14. A rotary liquid/gas separator assembly for separating a liquid/gas mixture into separate phases, said assembly comprising:
    a housing defining a separator chamber;
    a liquid/gas inlet;
    a shaft supported for rotation within said separator chamber and having a hollow section in communication with a gas outlet;
    a plurality of disks attached to rotate with said shaft, said disks in frictional contact with said liquid such that rotation of said disks creates centrifugal force driving said liquid toward inner walls off said separator chamber, wherein at least one of said plurality of disks includes a series of radial vanes disposed about an outer diameter of said at least one of said plurality of disks;
    a liquid outlet disposed within said housing and including a valve that opens in response to a predetermined pressure differential between liquid in said outlet and liquid in said separator chamber; and
    a drive for rotating said shaft at a first speed generating a first pressure of said liquid within said separator chamber, and a second speed for generating said predetermined pressure differential.

15. The assembly of claim 14, including a pressure differential sensor for sensing a liquid pressure and a gas pressure within the separator chamber.

16. The assembly of claim 15, wherein said pressure differential sensor is disposed within a pressure sensing part within said housing, said port in communication with a first pressure sensing passage in communication with an outer diameter of said separator chamber, and a second pressure sensing passage in communication with a point near said shaft.

17. The assembly of claim 14, wherein said drive rotates at said first speed until said pressure differential sensor indicates a pressure difference above a desired pressure indicative of a specific liquid level and then rotates said shaft at a second speed to generate said predetermined pressure differential for opening said outlet valve.

18. The assembly of claim 14, wherein said liquid outlet includes an opening tangential to said inner walls of said separator chamber.

19. The assembly of claim 14, wherein said shaft is supported on a hydrodynamic bearing assembly within said housing such that said shaft rotates on a cushion of liquid, said housing includes liquid passages to supply liquid to said hydrodynamic bearings and to exhaust liquid from said hydrodynamic bearings.

20. The assembly of claim 14, wherein at least one of said plurality of disks includes a cylinder attached about a circumference of said disk.

21. The assembly of claim 14, wherein each of said plurality of disks includes a plurality of openings disposed near said shaft and near an outer diameter of said disks for allowing flow of said liquid/gas mixture between said disks.

22. The assembly of claim 14, wherein said drive is an electric motor.

23. A rotary liquid/gas separator assembly for separating a low pressure liquid/gas mixture into liquid and gas components, said assembly comprising:
    a housing defining a separator chamber including a liquid/gas inlet, a liquid outlet, and a gas outlet;
    a shaft supported for rotation within said separator chamber and having a hollow section in communication with said gas outlet;
    a plurality of disks attached to said shaft and in frictional contact with the liquid/gas mixture such that rotation of said disks drives liquid of the liquid/gas mixture toward inner walls of said separator chamber;
a liquid outlet valve that opens in response to an increase in pressure above a predetermined level to exhaust liquid through said liquid outlet; and
a liquid feed passage communicating liquid from said separator chamber to a pump, said pump including a piston actuated within a pump chamber for increasing liquid pressure above said predetermined level to open said liquid outlet valve.

24. The assembly as recited in claim 23, wherein a swash plate driven by said shaft actuates said piston within said pump chamber.

25. The assembly as recited in claim 23, wherein said piston comprises a ball oscillated within said pump chamber.

26. The assembly as recited in claim 23, wherein an eccentric pin driven by said shaft actuates said piston within said pump chamber.

* * * * *

UNITED STATES PATENT AND TRADEMARK OFFICE
CERTIFICATE OF CORRECTION

PATENT NO. : 7,141,100 B2 Page 1 of 1
APPLICATION NO. : 10/758623
DATED : November 28, 2006
INVENTOR(S) : W. Clark Dean It is certified that error appears in the above-identified patent and that said Letters Patent is hereby corrected as shown below:

Column 8, line 28: "part" should be --port--

Signed and Sealed this

Twenty-seventh Day of February, 2007

JON W. DUDAS
*Director of the United States Patent and Trademark Office*